United States Patent [19]

Wittrisch et al.

[11] Patent Number: 4,775,009
[45] Date of Patent: Oct. 4, 1988

[54] PROCESS AND DEVICE FOR INSTALLING SEISMIC SENSORS INSIDE A PETROLEUM PRODUCTION WELL

[75] Inventors: Christian Wittrisch, Rueil-Malmaison; Jean Laurent, Orgeval; Charles Naville, Massy, all of France

[73] Assignee: Institut Français du Petrole, Rueil-Malmaison, France

[21] Appl. No.: 4,554

[22] Filed: Jan. 20, 1987

[30] Foreign Application Priority Data

Jan. 17, 1986 [FR] France ................................ 86 08536

[51] Int. Cl.$^4$ ........................ E21B 33/14; E21B 47/04
[52] U.S. Cl. ...................................... 166/250; 166/66; 166/285
[58] Field of Search .......................... 166/66, 250-255, 166/285, 290; 367/81, 82

[56] References Cited

U.S. PATENT DOCUMENTS

| | | | |
|---|---|---|---|
| 2,305,229 | 12/1942 | Alexander | 166/250 X |
| 2,309,791 | 2/1943 | Sanders | 166/285 |
| 3,106,960 | 10/1963 | Doak | 166/66 |
| 3,196,946 | 7/1965 | Lauffer | 166/285 |
| 3,489,219 | 1/1970 | Higgins | 166/253 |
| 4,191,250 | 3/1980 | Messenger | 166/66 X |
| 4,229,122 | 10/1980 | Ballantyne | 166/253 X |
| 4,480,690 | 11/1984 | Vann | 166/250 |
| 4,662,442 | 5/1987 | Debreville | 166/250 |

Primary Examiner—George A. Suchfield
Attorney, Agent, or Firm—Antonelli, Terry & Wands

[57] ABSTRACT

A process for installing seismic sensors inside a petroleum production well equipped with a cemented casing involves arranging the seismic sensors along an outer surface of the casing before being descended into a drilled well and cementing a ring-shaped space between the casing and the well so as to acoustically connect the sensors to geological formations. The sensors and transmission cables which link them to the surface are secured to centering devices guiding the descent of the casing or to the casing outer wall, possibly by means of a coating of damping material. The sensors may be inserted into sleeves secured outside the casing.

14 Claims, 4 Drawing Sheets

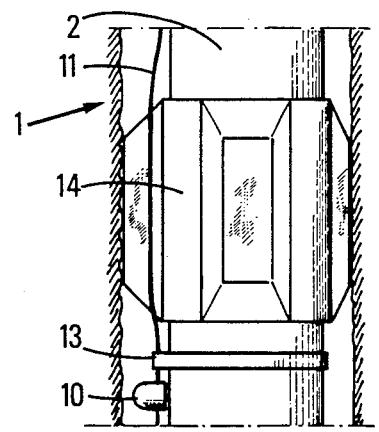
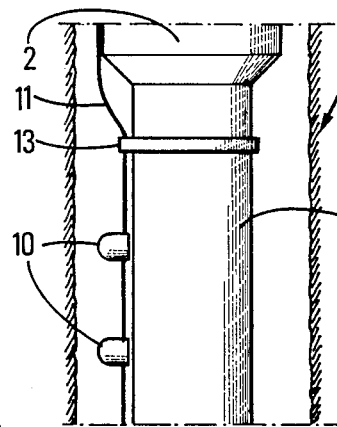
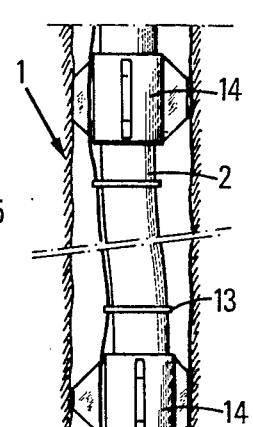
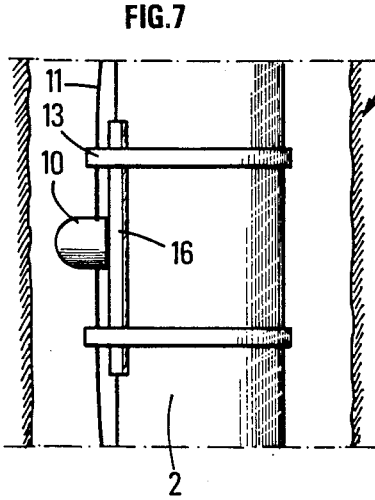
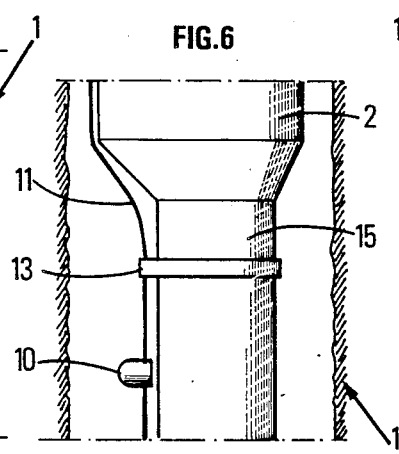
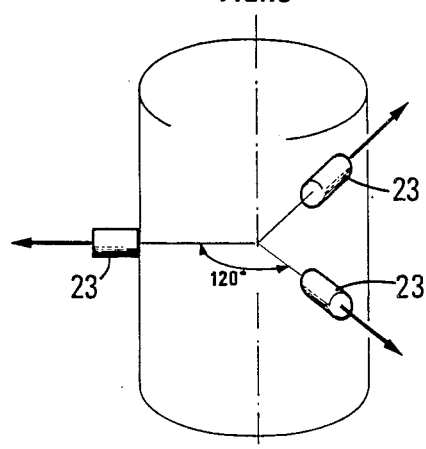

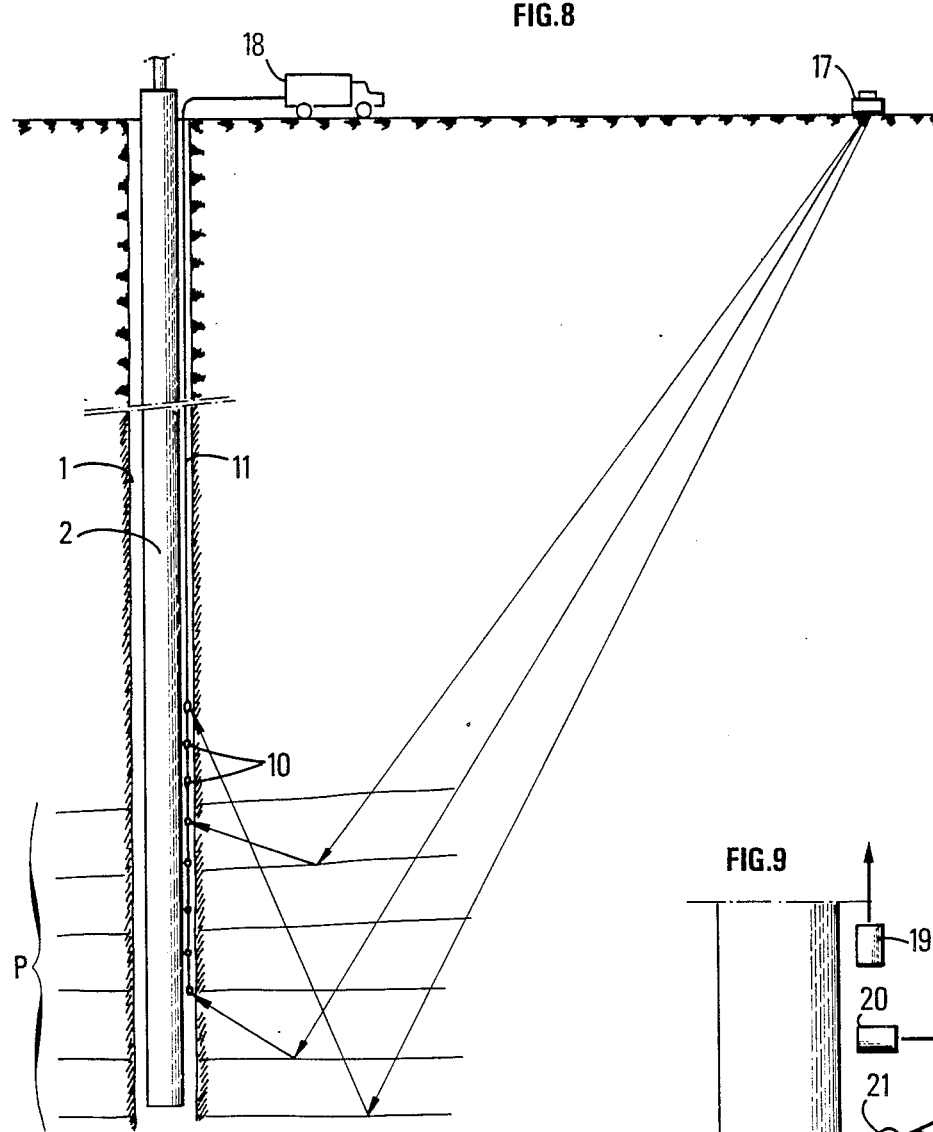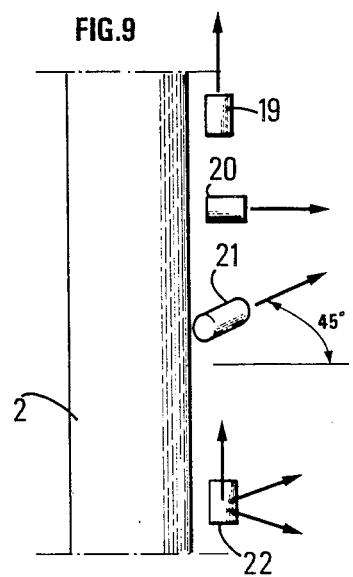

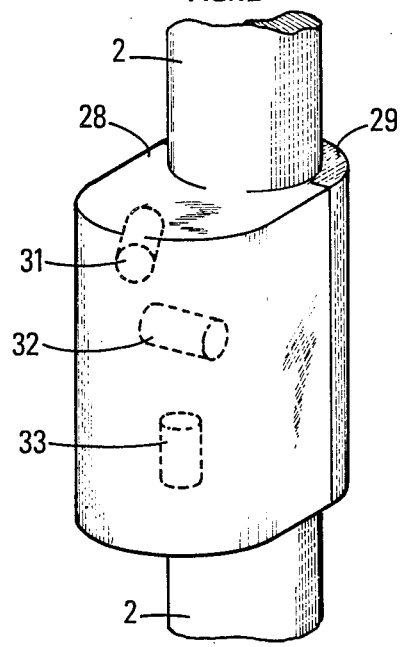
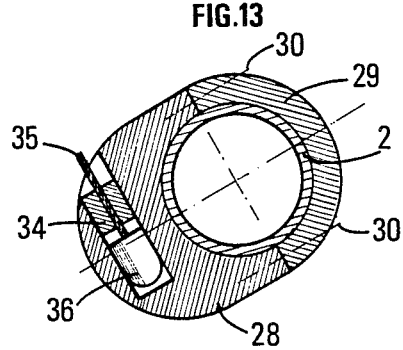

PROCESS AND DEVICE FOR INSTALLING SEISMIC SENSORS INSIDE A PETROLEUM PRODUCTION WELL

This invention relates to a process for installing seismic sensors inside a petroleum production well in order to carry out extremely diverse measurements concerning the state of the well, to monitor flows inside the well and also seismic readings enabling, in particular, evolution during time of the production zone to be determined.

Specialists are familiar with the uses of sensors inside fluid producing wells. For example, one of such uses consists of acoustically determining the quality of the borehole cementation coupling with the side wall, an outer pipe column or casing having been disposed therein. One conventional operation carried out in the completion phase of a drilled well consists of lowering a casting into the well and injecting cement into an annular or ring-shaped space so as to prevent the fluids produced by the well from escaping or migrating through this channel. The quality of the cementation, upon which the imperviousness of the ring-shaped or annular space depends, is, for example, determined by bringing down into the tubed casing an elongated sensor containing acoustic receivers transmitters disposed at various depths. The transmitted acoustic waves are picked up by various receivers after propagation inside the ring-shaped zone and in particular inside the cement. A comparison of the signals received enables one to determine, for example, which distribution of cement is thoroughly homogeneous.

Another familiar example of the use of sensors consists of lowering a probe inside a tubed well which contains a large number of various sensors enabling various parameters to be measured, especially acoustic noise, natural radioactivity, temperature, pressure, etc.

Some known examples of the use of sensors inside tubed wells are described in the European patent application Nos. 55634 or 98778 and the U.S. Pat. No. 4,390,878.

The positioning of sensors inside a tubed shaft is suitable for carrying out localized measurements of the nearby ring-shaped zone or for monitoring fluid flows inside the tubing. But is is not suitable, for example, for using seismic methods to determine the evolution of a reservoir in the course of operation. Seismic records are carried out, particularly by the method known as the vertical seismic profile method (VSP) which includes the reception of waves returned by various underground reflectors by means of a large number of geophones arranged at various depths inside a drilled well, these waves having been transmitted by a seismic generator disposed on the surface or possibly inside another well. The implementation of such a method using geophones descended into a fitted-out petroleum production well becomes much more difficult as the connection of the geophones with the environmental formations is made by means of a casing.

SUMMARY OF THE INVENTION

The process according to the invention allows for the installation of seismic sensors inside a drilled well that is equipped for producing petroleum fluids and that is provided with a cement-sealed casing inside the well. It is characterized in that the seismic sensors are disposed outside the casing in the space between the casing and the walls of the well and that the seismic sensors are embedded inside the cement which ensures cementing of the casing.

The various seismic sensors are, for example, disposed at various depths outside the casing and are linked to the surface by electric conducting wires. At each level of depth, a sensor or set of sensors is disposed. When the casing is externally integral with guidance means, the sensors are, for example, secured to these guidance means, the conducting wires being maintained by rings against the outer wall of the casing. The guidance means may, for example, include flexible centering blocks. To facilitate the mounting of the sensors, it is preferable to use dissymmetrical guidance means which move the casing towards one side of the wellbore over one part of its length, the sensors being disposed on the side opposite the casing. It is also possible to use casings, whose transversal section is reduced at at least one part of their length, the sensors being disposed, in the reduced section of the casing, against the casing itself. For coupling of the sensors, a layer of damper material can be inserted between the sensors and the casing.

One advantage of the process of the invention is that the sensors are directly connected by the cement with the environmental geological formations. They can then be used to receive the seismic signals due to microseisms produced inside these formations during well production period or those which are spread from a transmission point on the surface. This location or point may occur on the perpendicular line of the well or even over a direction determined in relation to the axis of the well or the well direction if the latter is contorted. A further possible application consists of receiving into a well the seismic signals emitted by a noise source disposed inside another well.

Sound connection between the sensors and the inside of the casing, obtained by the process according to the invention, also enables them to be used to detect the noises and vibrations resulting from flows circulating inside the well.

A further important advantage of the process lies in the fact that the installation of seismic sensors is very easily adapted to the equipment methods used in petroleum wells, the cementation also being used to couple the seismic sensors to the environmental formations.

BRIEF DESCRIPTION OF THE DRAWINGS

Other characteristics and advantages offered by the process are apparent from the following detailed a description of a number of embodiments which are given by way of example and which are by no means restrictive and from the accompanying drawings whereas:

FIG. 3 diagramatically represents a dissymetrical centering member enabling the casing to be moved laterally over a certain length so as to enlarge the space where the sensors are disposed;

FIG. 4 diagramatically represents the layout of sensors inside the casing out-of-centre zone;

FIG. 5 diagramatically represents an embodiment where the sensors are disposed inside a ring-shaped space increased by a restriction of the casing;

FIG. 6 represents a variant of FIG. 5 in which the casing restriction is dissymetrical;

FIG. 7 diagramatically represents another embodiment where a layer of damping material is inserted between each seismic sensor and the outer wall of the casing;

FIG. 8 is a sketch of a transmission/reception device enabling a seismic prospection of a well to be made inside a production zone;

FIG. 9 represents another embodiment in which directional sensors disposed at different depth levels can be used;

FIG. 10 shows an arrangement including three sensors disposed on the periphery of the casing and at 120° from each other;

FIG. 12 diagramatically represents a sleeve externally integral with the casing and provided with receptacles for the seismic sensors and FIG. 13 diagramatically represents the disposition of a seismic sensor inside its receptacle.

FIG. 1 shows a well 1 which is drilled to a first diameter up to a certain depth and, especially through the production zone, to a second diameter less than the first one. The well is conventionally fitted out with a casing made up of two parts 2a and 2b with unequal sections adapted to the diameters of the drilling. The part with the smallest diameter 2b is fitted with a variable volume packer sealing device 4 which is expanded to wall-in the ring-shaped space between itself and the other section 2a having a larger diameter and close to one of their mutual extremities. Inside the casing and as far as its section 2b with the smaller diameter, a tubing 5 is disposed. Another packer sealing device 6 is disposed near to the inner extremity of the tubing 5 so as to wall-in, in an extended position, the ring-shaped space between it and the lower part 2b of the casing. A pumping unit 7 supplied by a feeding electric 8 is disposed on the tubing 5. The part of the casing 2b crossing the production zone P is provided with a number of orifices 9. A tubing head 27 fitted with valves closes the casing at its upper extremity.

Figure 1:
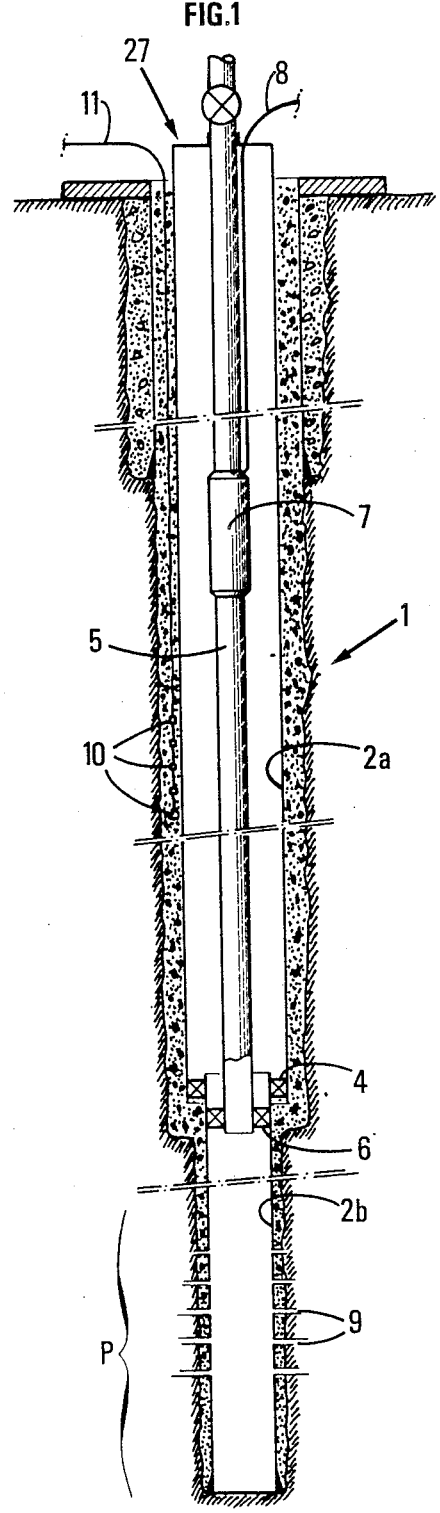
FIG. 1 represents in a very simplified way a well equipped out for production where the outer casing is connected to a large number of seismic sensors embedded inside the capping cement.
Figure 11:
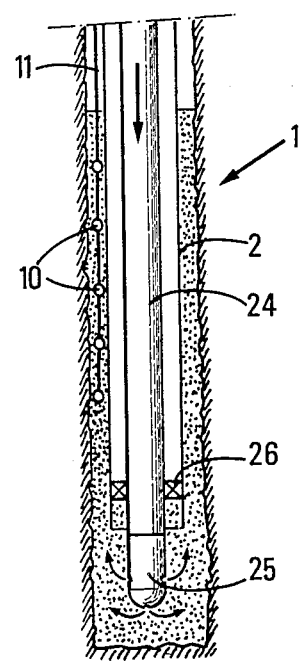
FIG. 11 diagramatically represents a known device which is descended into a tubed well so as to inject the capped cement.

The process according to the invention consists of disposing one or more seismic sensors outside the casing at a section having the largest diameter 2a (or its section having the most restricted diameter 2b if the volume of the outer annular or ring-shaped space so allows) before it is descended into the wellbore. These seismic sensors are connected to the surface by one or more transmission cables 11. The next step is to cement the casing. To achieve this, as is already known, a tube 24 terminated by a special injection joining piece 25 and containing a reverse-lock valve is lowered into the casing 2 as far as possible to its lower extremity. The tube 24 is immobilized by a packer sealing device 26 and cement is injected. The cement gradually fills up by ascending the ring-shaped space between the casing 2 and the hole 1. At the end of the cementing stage, all the seismic sensors 10 disposed inside the ring-shaped annular space are embedded inside the cement (See FIG. 11).

Figure 2:
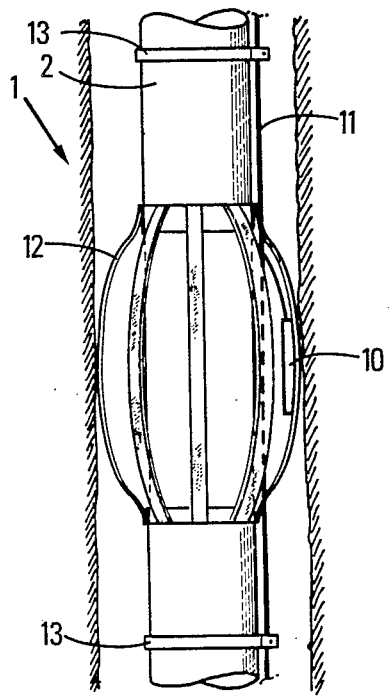
FIG. 2 diagramatically represents a means for securing the seismic sensors outside the outer casing.

Around the casing 2 and in order to facilitate its descent, centering elements 12 of a known type are fixed (FIG. 2), these having flexible blades or radial blades, for example. According to another embodiment, the seismic sensors 10 are secured to centering elements 12. The connecting wire 11 (or wires if there are more than one) is kept against the outer wall of the casing 2 by the clamping collars 13.

When the volume of the boxes housing the used seismic sensor 10 becomes incompatible with the dimensions of the ring-shaped space between the drilling and casing 2, dissymetrical guidance elements 14 (FIG. 3) can be used to bring the casing 2 out-of-center along that part of its length along which are disposed the sensors (FIG. 4). The seismic sensors can be secured to the guidance elements 14 or preferably, as shown by FIG. 3, kept against the outer wall of the casing 2 by the fixing clamps 13 of the link cable 11, for example. It is also possible to use casings comprising (FIGS. 5 or 6) at least one section 15 whose diameter is restricted. The restricted part may be symetrical (FIG. 5) or even dissymetrical (FIG. 6) if all the sensors are disposed on the same side of the casing.

According to another embodiment, a layer of elastic material 16 is inserted between each seismic sensor 10 and the wall of the casing 2 (FIG. 7) so as to acoustically uncouple the latter. The layer 16 may possibly be an outer coating of the casing.

All the seismic sensors 10 are disposed inside the ring-shaped space around the casing 2 so as to be used, as shown in FIG. 8, to record seismic readings. A seismic source 17 (a vibrator or pulse source) generates on the surface of the ground seismic waves which spread out in depth. The waves sent back by the various underground reflectors, and in particular those of the production zone P, are received by the various sensors 10 and the seismic signals detected are transmitted by the transmission cables 11 to a recording laboratory 18.

The seismic sensor can also be used to perform seismic prospection operations from well to well or even to produce a non-functional monitoring of phenomena occurring inside a producing well (flow noises of fluids circulating inside the columns) or when production has stopped (detection of formation fracturings caused by the production or injection fluids).

The seismic sensors used are, for example, geophones or accelerometers. The number used and their disposition are selected according to the intended applications.

The sensors are disposed, for example, on one side of the casing 1 facing a seismic generator, as shown by FIG. 8. It is also possible to use directional sensors (FIGS. 9, 10) whose axes are tangentially directed towards the casing (sensor 19) or along radial directions (sensor 20) or even along intermediate directions (sensor 21). These intermediate directions can be contained inside the transversal plane, as shown by FIG. 9, or even inclined towards the top or bottom in relation to such plane. At a given location, it is possible to dispose a box 22 containing 3 directional sensors orientated along three orthogonal directions.

It is also possible to dispose the sensors so as to determine the incoming direction of seismic signals. To this end, several directional sensors 23 are disposed on the periphery of the casing inside a given transversal plane at 120° from each other. According to the mode of embodiment of FIG. 10, the axes of the sensors are disposed radially. But this is not restrictive. It is also possible to incline the axes of the sensors in relation to the transversal plane, either towards the top of the shaft or towards the bottom, the angle of slope being any size whatsoever.

In its most usual configuration, the set of seismic sensors may include several sets of sensors divided up along part of the casing, each of the sets comprising a number of sensors, possibly directional, and disposed on the periphery of the casing.

By way of example, one mode of embodiment allows several directional sensors to be connected to the casing and consists (FIGS. 12 and 13) of securing to the latter sleeves comprising one or more receptacles. Each sleeve has two female moulds 28, 29 enclosing the casing and joined together by bolts (whose axes are marked 30). The sleeve is dissymetrical. The thickest female mould (28) comprises three cylindrical receptacles 31, 32, 33 whose axes are orientated along three orthogonal directions, i.e. two inside a horizontal plane and the third being parallel to the axis of the casing 2. Each receptacle is closed by a sealed cover 34. A twin conducting wire 35 is connected to each geophone 36. Conventional means (not shown) are connected to the cover 34 so as to ensure imperviousness of the wire passage 35.

Each sleeve with three receptacles could be replaced by three sleeves having a shorter length, each comprising a receptacle, such as 31 or 32, whose axis is contained inside a transversal plane or a receptacle such as 33 whose axis is parallel to the casing 2. A change in orientation of a geophone inside a transversal plane is easily obtained by causing the sleeve 28 to turn in relation to the casing.

We claim:

1. A process for installing seismic sensors inside a wellbore which is equipped for production of petroleum fluids and which includes a casing embedded into the wellbore by cementation, which comprises disposing seismic sensors outside the casing between the casing and sidewalls of the wellbore before cementation, and embedding the seismic sensors into the cement during cementation whereby said seismic sensors are coupled by cement to surrounding geological formations to enable seismic monitoring of the production of the well.

2. A process according to claim 1, which further comprises disposing various seismic sensors at various depths outside the casing and linking all of said seismic sensors to the surface with electrically conductive connecting wires.

3. A process according to claim 2, which further comprises disposing at least one group of seismic sensors outside the casing approximately at a given depth, the seismic sensors of said group being connected to the surface with electrically conductive connecting wires.

4. A process according to claim 3, wherein a large number of seismic sensors are disposed at various depths.

5. A process according to claim 1, which further comprises providing the casing externally with guidance means, securing said seismic sensors to the guidance means and maintaining the connected electrically conductive connecting wires against the outer wall of the casing by clamps.

6. A process according to claim 5, wherein the guidance means are disymmetrical so that the casing is displaced towards one side of the wellbore as regards at least one part of the length thereof, said seismic sensors being disposed outside the casing on the opposite side.

7. A process according to claim 1, wherein a transverse section of said casing is reduced on one restricted part of the length thereof, said seismic sensors being disposed against the casing in said restricted part.

8. A process according to claim 1, which further comprise using directional sensors, at least one directional sensor being disposed at each level of depth.

9. A process according to claim 8, which further comprises disposing several seismic sensors at each depth level so as to pick up polarized waves along several axes.

10. A process according to claim 3, which further comprises disposing directional sensors on the outer periphery of the casing.

11. A process according to claim 4, which further comprises disposing directional sensors on the outer periphery of the casing.

12. A process for installing geophones or accelerometers inside a wellbore which is equipped for production of petroleum fluids and which includes a casing embedded into the wellbore by cementation, said process comprising disposing said geophones or accelerometers outside the casing and embedding the geophones or accelerometers into the cement which ensures bedding of the casing.

13. A process for coupling seismic sensors with geological formations surrounding a wellbore which is equipped for production of petroleum fluids and which includes a casing embedded into the wellbore by cementation, said process comprising disposing said seismic sensors outside the casing and embedding the seismic sensors into cement during cementation of said casing.

14. A process according to claim 13, wherein said seismic sensors are arranged along an outer portion of the casing, the casing and seismic sensors are lowered into the wellbore and then cement is introduced into a space between the casing and side walls of the wellbore to effect embedding of the seismic sensors and cementation of the casing.

* * * * *